F. A. ELDRIDGE.
Insect-Destroyers.

No. 158,263.

Patented Dec. 29, 1874.

WITNESSES
Mary S. Utley
Geo. E. Upham

INVENTOR
Frank A. Eldridge
Chipman Hosmer & Co
Attorneys

UNITED STATES PATENT OFFICE.

FRANK. A. ELDRIDGE, OF BRENHAM, TEXAS, ASSIGNOR OF ONE-HALF HIS RIGHT TO WILLIAM B. ROYALL, OF SAME PLACE.

IMPROVEMENT IN INSECT-DESTROYERS.

Specification forming part of Letters Patent No. 158,263, dated December 29, 1874; application filed June 20, 1874.

*To all whom it may concern:*

Be it known that I, FRANK. A. ELDRIDGE, of Brenham, in the county of Washington and State of Texas, have invented a new and useful Machine for Sprinkling upon Plants Poisonous Compounds, such as "Royall's Cotton-Worm Destroyer," and "Pagin's Potato-Bug Killer;" and I do hereby declare that the following is a full, clear, and exact description thereof, which will enable others skilled in the art to manufacture the same.

This invention has relation to machines which are designed for distributing poison-dust over the leaves of plants for the destruction of insects, especially the worms which prey on the cotton-plant.

The nature of my invention consists in the employment, upon a suitable vehicle, of two or more receptacles for containing poison-powder, which receptacles have perforated or sieve bottoms, and contain within them rotary stirring-blades and brushes, actuated as will be hereinafter explained, whereby the poison-dust can be regularly, and at the same time economically, distributed upon two or more rows of plants at the same time.

Figure 1:
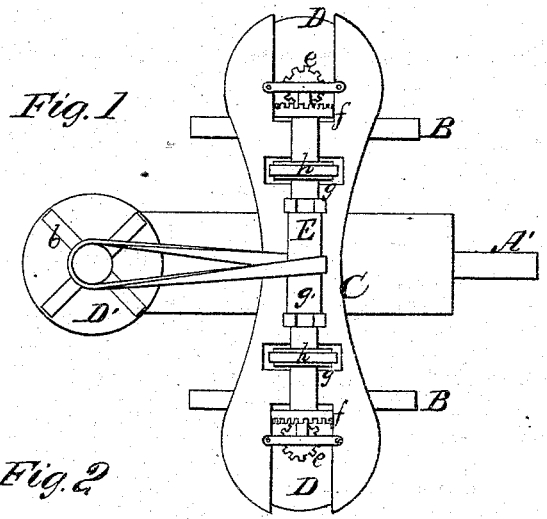
Figure 2:
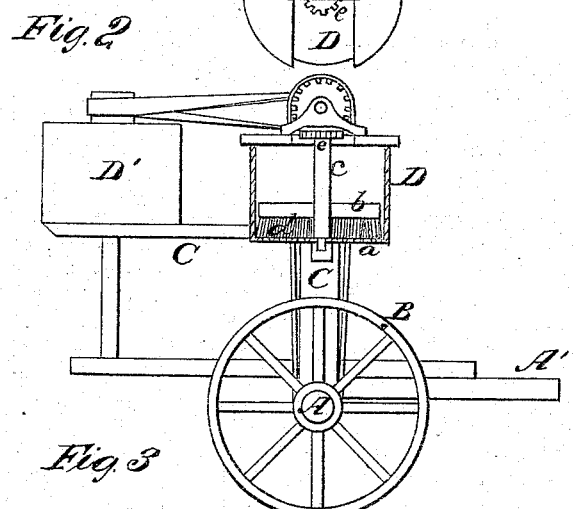
Figure 3:
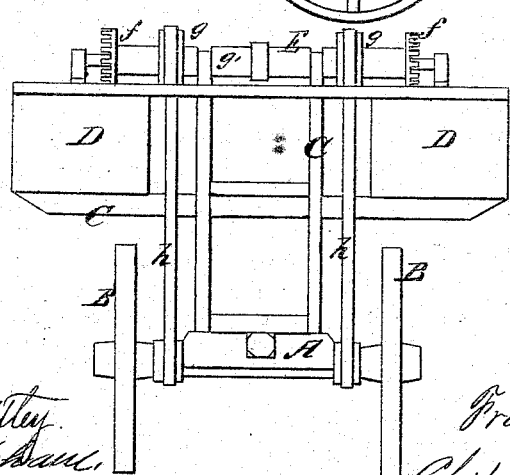

Figure 1 is a top view of my improved machine. Fig. 2 is a side elevation, showing one of the poison-dust receptacles in section. Fig. 3 is a front elevation of the machine.

Similar letters of reference indicate corresponding parts in the several figures.

In the annexed drawings, A designates the axle of two transporting-wheels, B B, from which axle rises a frame, C, carrying three poison-powder receptacles, D D D', which are, preferably, of cylindrical form, and which have finely-perforated bottoms $a$. The two side receptacles, D D, are arranged so as to distribute the powder upon two rows of plants, and the rear receptacle distributes the powder upon the intermediate row, thus playing on three rows at the same time. Each receptacle contains radial blades $b$, which are applied to a central shaft, $c$, and provided with brushes $d$, which act upon the perforated bottom $a$.

The blades $b$ stir the powder, and prevent it from clogging, and the brushes compel it to pass through the screen-bottoms in a uniform manner.

The upper ends of the shafts $c$ of the receptacles D D have spur-wheels $e$ on them, which engage with spur-wheels $f$ on the ends of a horizontal shaft, E, which has its bearings on top of the frame C, and which is provided with pulleys $g\ g\ g'$. The pulleys $g\ g$ receive rotation from pulleys on the inner ends of the hubs of wheels B B through the medium of belts $h\ h$.

The rotation thus given to shaft E is transmitted to the shaft $c$ of the blades and brushes which are in the receptacle D'.

The machine thus described will be propelled by two horses hitched to the draft-tongue A', and, if desired, the axle A may be centrally arched, so as not to interfere with the plants over which it passes.

I also contemplate using sprinklers for discharging a spray of water on the plants previous to distributing the poison-powder, which sprinkler will be actuated by belts and pulleys, or gearing suitably applied.

I also contemplate the use of a second bottom in each receptacle, placed a few inches above the lower one, and composed of two pieces of wood or metal, resting one upon the other, and made movable, with fine perforations, and of sufficient strength to support the weight of the powder.

The brushes will be placed between the two bottoms, and above the second bottom pieces of wire or small pegs of wood will be inserted in the shaft $c$, which will keep the powder well stirred up, so that it will readily flow through the perforations and fall upon the fixed bottom $a$ to be sprinkled through, and, by means of the brushes, evenly distributed upon the plants.

For the purpose of adapting the machine to rows of different distances apart the revolving shaft may be made extensible.

What I claim as new is—

In a machine for distributing poison-powder on plants, the powder-receptacles containing rotating brushes $d$ and radial blades $b$, arranged over perforated bottoms $a$, and actuated substantially as described.

FRANK. A. ELDRIDGE.

Witnesses:
B. ELDRIDGE,
J. T. I. O'RIORDAN.